United States Patent [19]
Coleman

[11] Patent Number: 5,322,306
[45] Date of Patent: Jun. 21, 1994

[54] VEHICLE FOR CONVEYING TROLLEYS

[75] Inventor: John J. Coleman, Gold Coast, Australia

[73] Assignee: Rosecall Pty Ltd., Young, Australia

[21] Appl. No.: 109,980

[22] PCT Filed: Apr. 10, 1990

[86] PCT No.: PCT/AU90/00140
§ 371 Date: Sep. 27, 1991
§ 102(e) Date: Sep. 27, 1991

[87] PCT Pub. No.: WO91/11922
PCT Pub. Date: Oct. 18, 1990

Related U.S. Application Data

[63] Continuation of Ser. No. 768,624, Sep. 27, 1991, abandoned.

[30] Foreign Application Priority Data

Apr. 10, 1989 [AU] Australia .................. PJ3606
Jan. 5, 1990 [AU] Australia .................. PJ8097

[51] Int. Cl.⁵ .............................. B62D 39/00
[52] U.S. Cl. ..................... 280/33.992; 180/19.1;
180/65.1; 188/173; 242/107.4 R; 280/33.991
[58] Field of Search ............ 280/33.991, 33.992;
180/19.1, 65.1; 188/171, 173; 242/107.4 R,
107.6; 410/3, 4, 7, 23, 100

[56] References Cited

U.S. PATENT DOCUMENTS

| 2,512,565 | 6/1950 | Hallander | 188/171 |
| 2,623,760 | 12/1952 | Fornelius | 242/107 |
| 3,524,512 | 8/1970 | Voeks et al. | 280/33.991 |
| 4,094,372 | 6/1978 | Notter | 180/181 |
| 5,082,074 | 1/1992 | Fischer | 280/33.991 |

FOREIGN PATENT DOCUMENTS

| 2350308 | 4/1975 | Fed. Rep. of Germany | 280/33.991 |
| 2450692 | 4/1976 | Fed. Rep. of Germany | 280/33.991 |
| 1106549 | 12/1955 | France | 410/23 |
| 9011922 | 10/1990 | World Int. Prop. O. | 280/33.991 |

Primary Examiner—Eric Culbreth
Attorney, Agent, or Firm—Bauer & Schaffer

[57] ABSTRACT

A vehicle for conveying trolleys have driving wheels activated by a control assembly to engage and advance one or a series of trolleys. A reel assembly is detachably engageable with the leading trolley and supports a first anchoring line which secures the trolleys to the vehicle and a second control line which is connected to the control assembly and which made be pulled or tensioned to control operation of the vehicle.

13 Claims, 4 Drawing Sheets

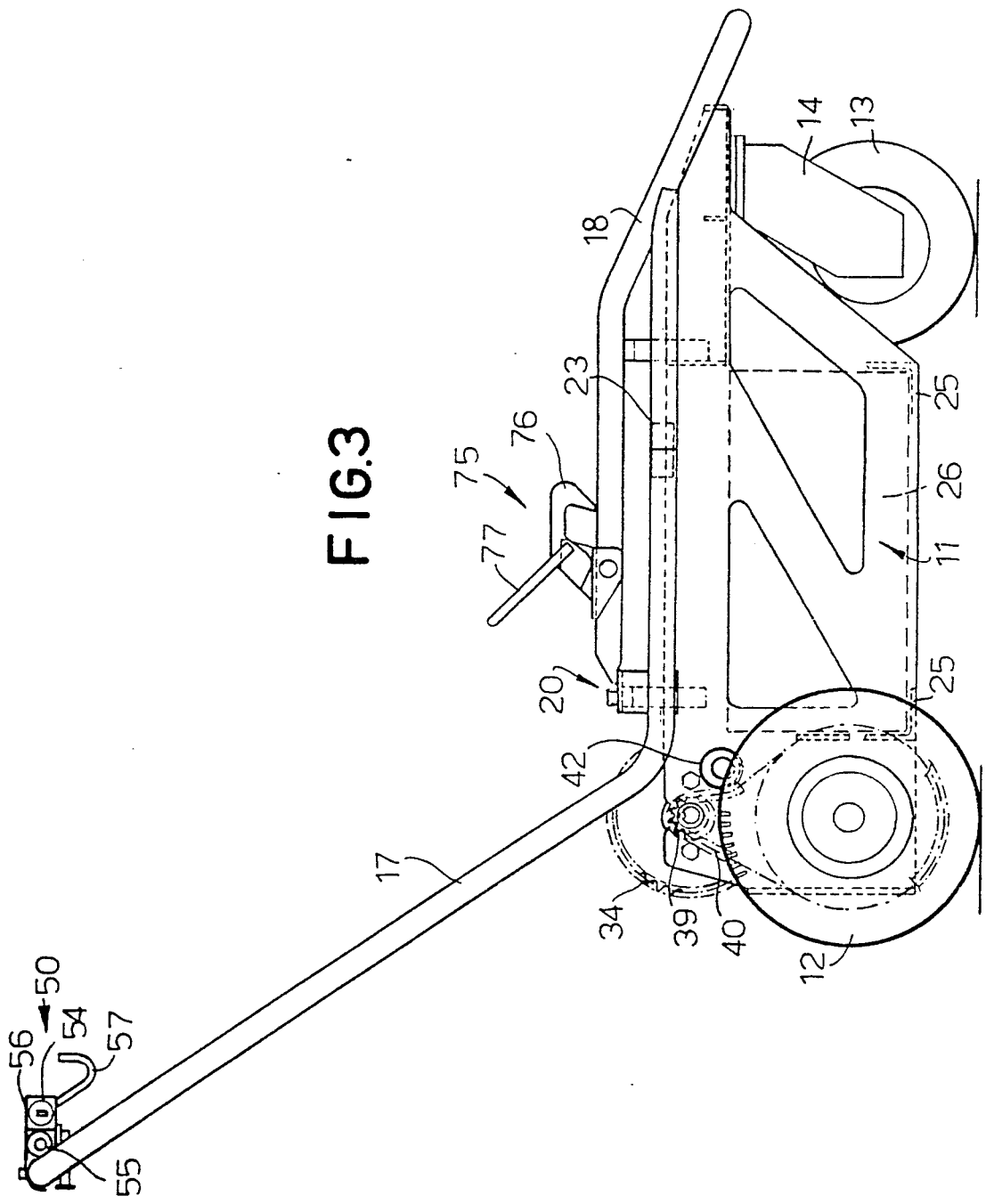

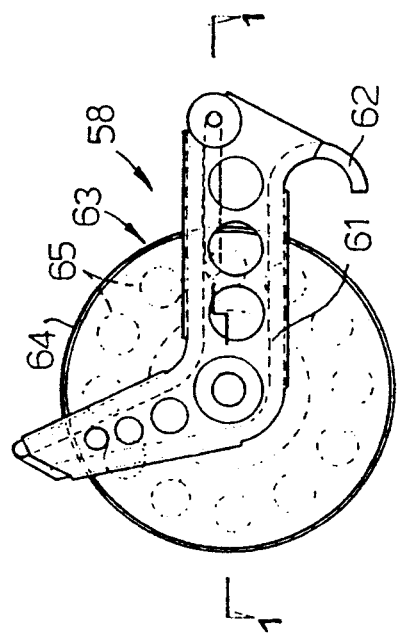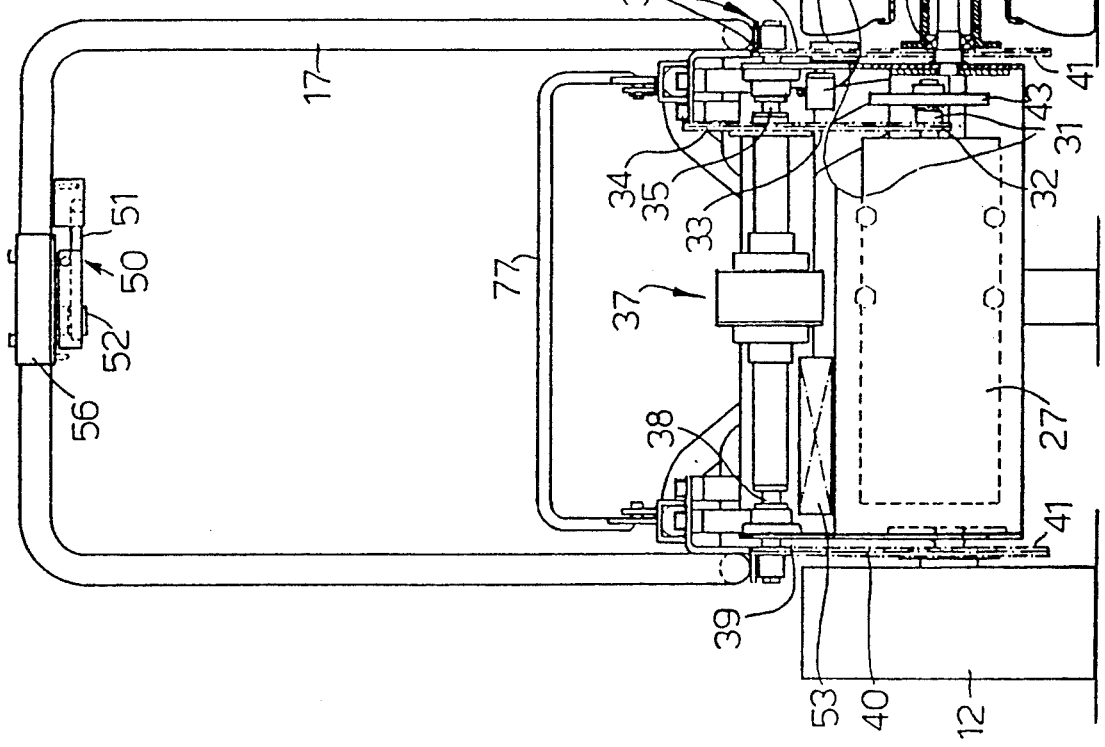

VEHICLE FOR CONVEYING TROLLEYS

This is a continuation of Ser. No. 07/768,624, filed Sep. 27, 1991 now abandoned.

TECHNICAL FIELD

This invention relates to improvements to vehicles and in particular to a vehicle for conveying, lifting, towing or propelling various loads.

BACKGROUND ART

The collection of trolleys in the vicinity of supermarkets creates a number of problems. It is important of course for such trolleys to be collected as quickly as possible and delivered back to the store for use by other customers. Trolley collection in many instances is undertaken by hand however, there is a limit to the number of trolleys that can be collected using this method. Whilst there has been proposed in the past a vehicle for collecting and conveying trolleys such a vehicle requires a considerable amount of space for working and conveyance of the trolleys is achieved by loading the trolleys onto the apparatus.

DISCLOSURE OF THE INVENTION

The present invention aims to provide a vehicle which in a first aspect is suitable for moving supermarket trolleys or an engaged stack of such trolleys in a reliable and efficient manner. The present invention also aims to provide apparatus which occupies little space and which may be used both indoors and outdoors. The present invention also aims to provide a vehicle which in addition to being suited for trolley collection as aforesaid is capable of many other applications. Other objects and advantages of the invention will become apparent from the following description.

The present invention thus provides a vehicle for use in conveying trolleys or the like, said vehicle having a mobile chassis including at least one drive wheel, a drive motor on said chassis, means for selectively coupling said motor to said drive wheel so as to cause advancement of said vehicle, means for engaging a trolley or a series of said trolleys and coupling means for coupling said vehicle to said trolley or trolleys.

Suitably said coupling means comprises a line which extends between the trolley or leading trolley in a series of said trolleys and said vehicle. Suitably the vehicle includes an upstanding handle which enables the vehicle to be manipulated and suitably, also the vehicle includes at least one castor wheel to permit easy steering of said vehicle.

The line which couples the vehicle to the trolley or trolleys is preferably wound upon a spring biased reel which may be coupled to the leading trolley whilst a further line also extends between the leading trolley and the vehicle so as to be operable to cause motive force to be applied from the drive motor to the driving wheel or wheels of the vehicle. The vehicle may also include a brake which serves to prevent movement of the vehicle when the vehicle is not being driven.

BRIEF DESCRIPTION OF THE DRAWINGS

In order that the invention may be more readily understood and put into practical effect reference will now be made to the accompanying drawings which illustrate a preferred embodiment of the invention and wherein:

FIG. 3 is a side elevational view of the vehicle;

FIG. 4 is a rear partly sectioned elevational view of the vehicle;

FIG. 5 is an elevational view of the coupling reel assembly for the vehicle;

FIG. 6 is a sectional view along line 1—1 of FIG. 5;

BEST MODE FOR CARRYING OUT THE INVENTION

Figure 1:
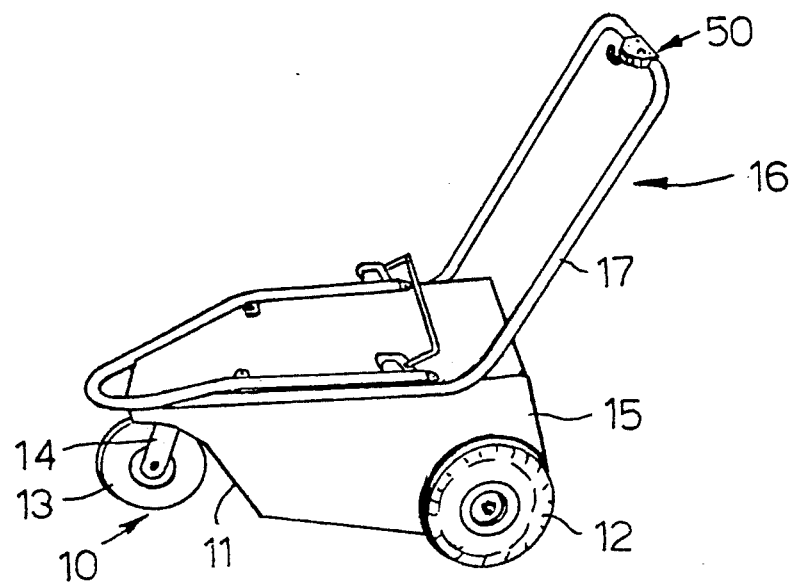
FIG. 1 is a perspective view of the vehicle of the invention.

Referring to the drawings and firstly to FIG. 1 there is illustrated a vehicle 10 according to the present invention which includes a chassis 11 which supports a pair of opposite driveable wheels 12 at the rear end of the vehicle and a single castor wheel 13 at the forward end of the vehicle, the latter being supported for free rotation between a pair of arms 14, the arms 14 being supported on the chassis 11 for free pivotal movement about a substantially vertical axis. The chassis 11 supports as described further below a drive motor for the vehicle and as well as a transmission which is enclosed within a cowling 15 which renders the mechanism weather proof, the cowling 15 suitably being formed of a moulded glass reinforced plastics material.

Figure 2:
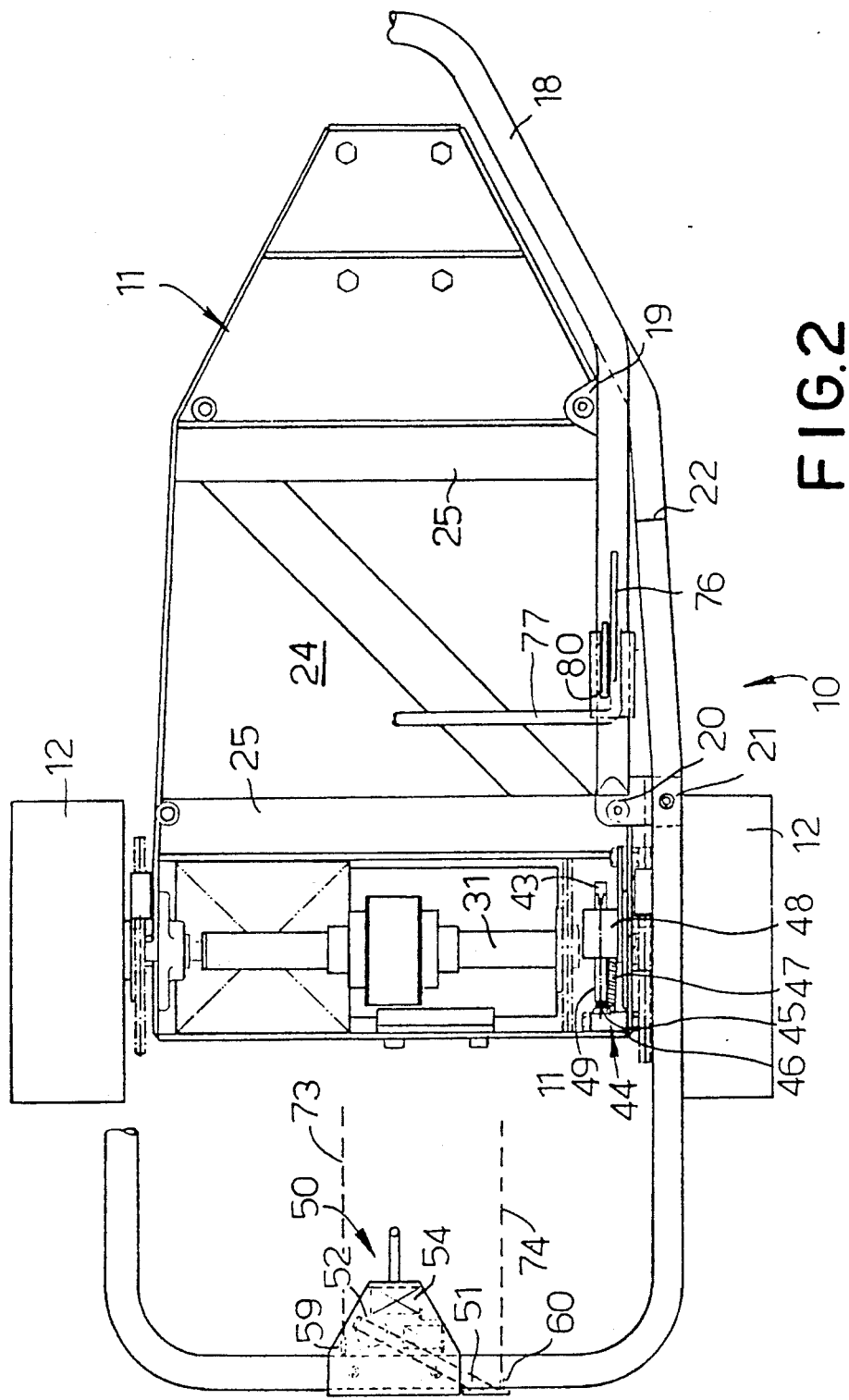
FIG. 2 is a partly sectioned plan view of the vehicle of FIG. 1 with the cowling removed.

Secured to the chassis 11 and holding the cowling in position is a handle assembly 16 which as more clearly shown in FIGS. 2 to 4 includes an upwardly extending U-shaped gripping handle 17 which is inclined rearwardly and which merges into a V-shaped frame 18 portion which extends over the top of the cowling 15 so as to protect same from damage. The frame 18 includes opposite pairs of brackets 19 which are secured through the cowling 15 to the chassis 11 by conventional bolts. The V-shaped frame 18 is further secured to the chassis 11 by bolts at 20 and similarly the handle 17 is secured to the chassis 11 by bolts at 21. The handle 17 is separable from the remainder of the handle assembly 16 at 22 with internal spigots 23 being provided to enable joining and reparation. Thus removal of the bolts at 21 will permit the U-shaped handle 17 to be removed to permit easy transport of the vehicle.

Referring further to FIGS. 2, 3 and 4 which illustrate further details of the vehicle 10, the chassis 11 as shown defines a compartment 24 includes angle sections 25 for supporting one or more batteries 26 which serve to supply current to a drive motor 27 as described below. Access to the battery compartment 24 is achieved by detaching the handle assembly 16 from the chassis 11 which permits the cowling 15 to be lifted from the vehicle 10.

The respective driveable wheels 12 are supported on respective stub axles 28 which are secured to opposite sides of the chassis 11 and the wheel hubs 29 are mounted rotatably on the axles 28 via bearings 30. Mounted on the drive shaft 31 of the motor 27 is a sprocket 32 which drives through a chain 33 a larger sprocket 34 mounted at one end of a transmission shaft 35 which projects outwardly at one side of the chassis 11 at 36 and which is connected through a differential 37 to a further shaft 38 which projects of the other side of the chassis 11.

The respective shafts 35 and 38 are fitted with driving sprockets 39 which are connected through chains 40 to sprockets 41 secured to the wheel hubs 29. Thus when the motor 27 is driven, drive is transmitted to both wheels 12 whilst the differential 37 permits the wheels to be rotated at different speeds when the vehicle 10 is being turned. Chain tensioning wheels 42 are provided to maintain tension in the chains 40.

The drive shaft 31 of the drive motor 27 also carries a brake wheel 43. A brake arm 44, including a brake pad 45 is pivotally mounted to the chassis 11 at 46 and is normally biased into engagement with the wheel 43 by a spring 47 to brake the motor 27 when the vehicle is not operating. A solenoid 48 is provided to disengage the brake arm 44 from the wheel 43 to release the wheel 43 and motor 27 when the vehicle 10 is operating; the solenoid 48 for this purpose including an actuating arm 49 coupled to the brake arm 44.

The handle 17 also carries a control assembly 50 for controlling operation of the vehicle, the control assembly 50 including a control arm 51 secured to the shaft of a potentiometer 52 which is electrically connected by means of a cable (not shown) to a motor controller 53. Pivoting the arm 51 in opposite directions causes the motor 27 to be driven in opposite directions and thus the vehicle 10 to move in a forward or reverse direction. The extent of pivotal movement of the arm 51 also varies the current supplied to the motor 27 and thus the speed of the vehicle 10. A spring bearing arrangement is provided to normally bias and return the arm 51 to a neutral central position where no current is applied to the motor 27. When the arm 51 is moved away from its neutral position, the brake solenoid 48 is activated to move the brake pad 45 away from the wheel 43 to release the brake.

The control assembly 50 also carries a key activated switch 54 for placing the vehicle in an operational mode and a socket 55 so as to enable recharging of the batteries from a remote source.

The control assembly 50 further includes a bracket 56 secured to the handle 17 and the bracket 56 includes a hook 57 for supporting a reel assembly 58 (see FIG. 5) and an eyelet 59 for attachment of a connecting line as more clearly described below. The arm 51 also carries a anchoring point 60 to which a further control line can be connected as also further described below.

For control of the vehicle 10 in use, the reel assembly 58 shown in FIGS. 5 and 6 is provided, the reel assembly 58 including a pair of side arms 61 terminating in hooks 62 which engage over a trolley in use. The arms 61 also rotatably support a spool 63 which includes a disc 64 at one end provided with a plurality of circumferentially spaced apertures 65 and a hollow housing 66 at it opposite end for housing a tension spring 67 normally tending to rotate the spool 63 in one direction.

A hollow tube 68 also extend between the arms 61 and a locking pin 69 extends through the tube 68 and is provided with a knob 70 at one end and a return portion 71 at its other end which is adapted for engagement with a selected aperture 65 to lock the spool 63 against rotation. The locking pin 69 is biased by a spring 72 to the locked position of FIG. 6.

The spool 63 supports a pair of cables or lines 73 and 74 which are respectively coupled at one end to the eyelet 59 and anchoring point 60 and the spool 63 at their opposite ends.

The V-shaped frame 18 also including a coupling hook assembly 75 includes a pair of pivotally mounted hooks 76 secured to a U-shaped handle 77. The hooks 76 are normally biased to the position of FIG. 2 by means of a spring 80.

Figure 7:
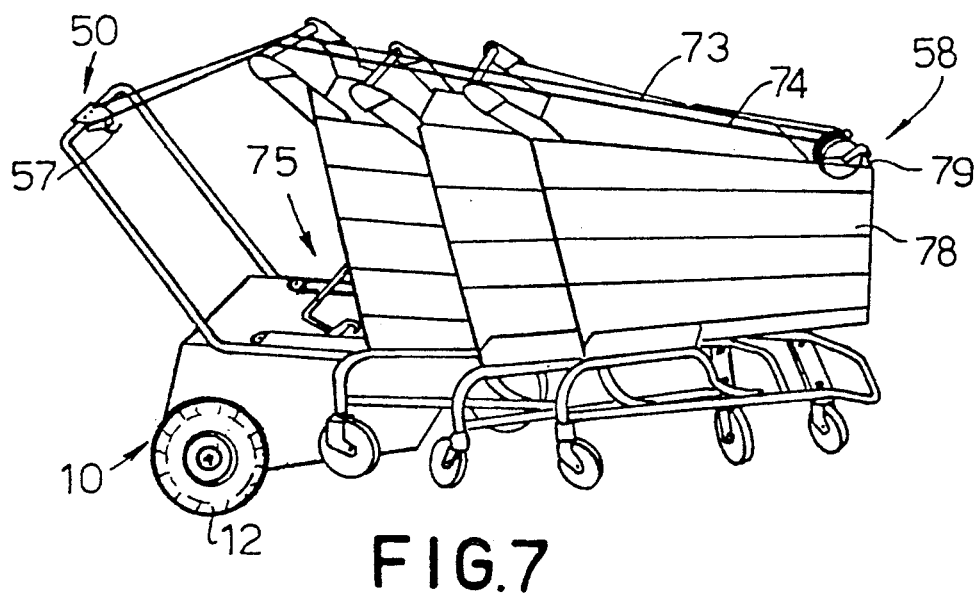
FIG. 7 illustrates operation of the apparatus of the invention.

In use and as shown in FIG. 7, the vehicle is moved to a position into alignment which a plurality of trolleys 78 arranged in a stacked relationship. Alternatively, the control arm 51 may be operated to cause the motor 27 to drive the wheels 12 and cause the vehicle to be moved to the position shown. During this movement, the reel assembly 58 is normally supported from the handle 17 via the hook 27. The V-shaped leading frame 18 facilitates location of the vehicle 10 as shown partly beneath the trailing trolley 78. The coupling hook assembly 75 may then be used to positively couple the vehicle 10 to the trailing trolley 78.

The reel 58 may then be detached from the hook 57 and coupled over the frame member 79 of the leading trolley 78 by means of the hooks 62 with the knob 70 being depressed to permit rotation of the spool 63 and unwinding of the line 73 and 74. Thereafter the knob 69 is released to lock the spool 63 when the reel assembly 58 is coupled as shown.

Tension may then be applied to the line 74 so as to cause pivotal movement of control arm 51 carrying current to be supplied to the motor 27 and the vehicle 10 to be driven. At the same time, the solenoid 48 is activated to release the brake. The vehicle 10 and stacked trolleys 78 can then be steered from the leading trolley 78 to a drive position. When the line 74 is released, the arm 61 connected to spool 63, over which the line 74 is wound, returns to its neutral position and the brake solenoid 48 released so that the brake arm 44 is moved into braking engagement with the brake wheel 43.

The vehicle 10 may be in many other configurations than that described above and may if desired include a pair of steerable or caster wheels. Furthermore, the control lines 74 may be directly connected to a switch supported on the vehicle chassis 11 to control motor operation.

In a further configuration, the function of the lines 73 and 74 may be achieved by the use of a single line or cable. Other control mechanisms known in the art may be employed for controlling the drive motor. The drive motor may also comprise an internal combustion motor although an electric motor is preferred.

All other variations and modifications to the invention as would be apparent to persons skilled in the are deemed to fall within the broad scope and ambit of the invention as defined in the appended claims.

I claim:

1. A vehicle for conveying mobile loads of at least one trolley comprising a mobile chassis having at least one drive wheel, a drive motor on said chassis selectively operable for transmitting drive to said drive wheel, and coupling means for coupling said vehicle to said mobile load, said coupling means comprising a line extending from said vehicle and being releasably attached to the leading end of said load, and control means for remotely controlling the operation of said drive motor, said control means including a further line extending from said vehicle and being releasably attached to the leading end of said load whereby application of drive to said drive wheel may be controlled from said leading end of said load.

2. A vehicle according to claim 1, including a movable control arm for controlling the operation of said drive motor, said further line being connected to said control arm whereby tension applied to said further line causes movement of said control arm.

3. A vehicle according to claim 2 wherein said drive motor comprises an electric motor and wherein movement of said control arm controls the application of current to said motor.

4. A vehicle according to claim 2, including means for retracting said lines.

5. A vehicle according claim 4, wherein said retracting means includes a reel assembly, said reel assembly being adapted for releasable coupling to the leading end of said load.

6. A vehicle according to claim 5 wherein said reel assembly includes a rotatable spool about which said lines are wound, biasing means associated with said spool for causing said spool to normally retract said lines and releasable lock means for locking said spool against rotation.

7. A vehicle according to claim 1, including brake means for preventing movement of said vehicle when said vehicle is not being driven, said brake means being disengaged upon activation of said drive motor.

8. A vehicle according to claim 7, wherein said brake means includes a brake wheel driven by said drive motor, a brake member normally biased into engagement with said brake wheel and solenoid means for releasing said brake member upon motivation of said drive motor.

9. A vehicle according to claim 1 and including an upstanding handle from which said vehicle may be manipulated and steered.

10. A vehicle according to claim 1 and including at least one castor wheel to permit steering of said vehicle.

11. A vehicle according to claim 1, wherein said coupling means further includes latch means whereby said vehicle may be selectively engaged with an adjacent portion of said mobile load.

12. A vehicle for conveying mobile loads of at least one trolley comprising a mobile chassis having at least one drive wheel, an electric drive motor on said chassis selectively operable for transmitting drive to said drive wheel, battery means supported on said chassis for supplying current to said drive motor, control means for controlling the application of current from said battery means to said drive motor, a reel assembly releasable attachable to the leading end of said load, said reel assembly carrying first and second lines, said first and second lines being connected to said vehicle, said first line being adapted to be extended between said vehicle and said reel assembly for coupling said vehicle to said mobile load, and said second line being adapted to be extended between said vehicle and said reel assembly and coupled to said control means for remotely controlling operation of said drive motor, whereby application of current from said battery means to said drive motor and thus drive from said drive motor to said drive wheel may be controlled by application of tension to said second line from said leading end of said load.

13. A vehicle according to claim 12, wherein said reel assembly is operable to retract said first and second lines.

* * * * *